United States Patent
Cumella et al.

[15] 3,667,085
[45] June 6, 1972

[54] CASTER PAD

[72] Inventors: Charles Cumella, Bronx; Joseph Cutrone, North Merick, both of N.Y.

[73] Assignee: Federal Casters Corporation, Copiague, N.Y.

[22] Filed: May 21, 1970

[21] Appl. No.: 39,361

[52] U.S. Cl. ............................................................. 16/30
[51] Int. Cl. ......................................................... B60b 33/00
[58] Field of Search ................................... 16/18, 30, 29, 31

[56] References Cited

UNITED STATES PATENTS

| | | | |
|---|---|---|---|
| 3,097,775 | 7/1963 | Waltz | 248/177 |
| 2,790,196 | 4/1957 | Rideout et al. | 16/30 |
| 2,800,679 | 7/1957 | Schultz, Jr. | 16/30 |
| 3,452,380 | 1/1969 | Walther | 16/30 |

FOREIGN PATENTS OR APPLICATIONS

| | | | |
|---|---|---|---|
| 590,995 | 3/1925 | France | 248/188.8 |
| 1,481,896 | 4/1967 | France | 16/30 |

Primary Examiner—Bobby R. Gay
Assistant Examiner—Doris L. Troutman
Attorney—Robert I. Pearlman

[57] ABSTRACT

A caster pad for mounting a caster or roller assembly to a container or receptacle or the like wherein the caster pad is provided at opposite ends thereof with means for removably supporting the caster assembly relative to the pad without the need for separate fasteners and the like.

8 Claims, 7 Drawing Figures

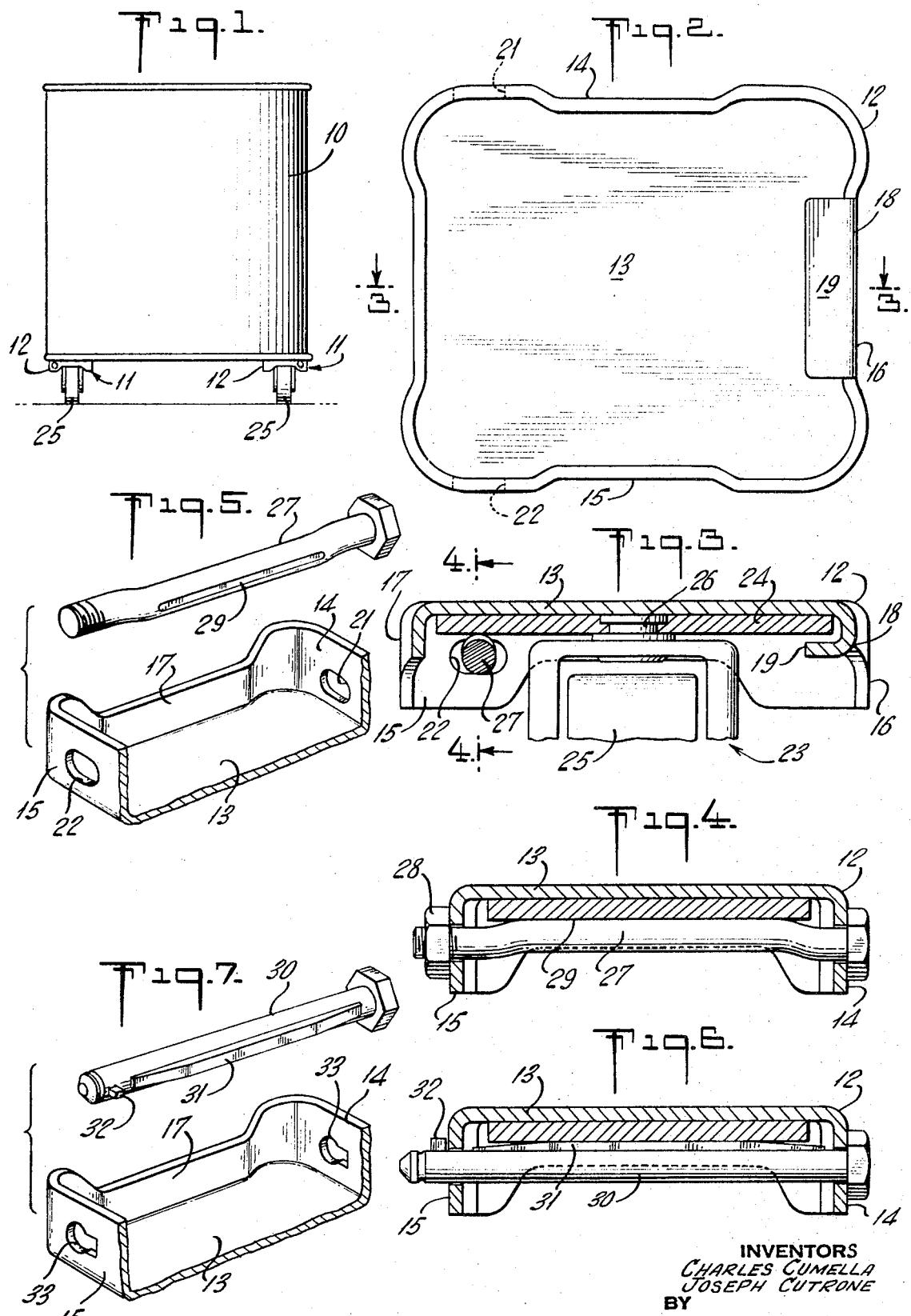

3,667,085

CASTER PAD

SUMMARY OF THE INVENTION

The present invention relates to means for movably supporting a container or receptacle or the like, and more particularly to a novel and improved mounting arrangement for removably supporting a caster or roller assembly on a caster pad in a relatively simple and inexpensive manner without the need for using separate fasteners to positively lock the caster assembly in place.

Specifically, the present invention comprises a caster pad provided adjacent one end with an inwardly turned integral flange or support shelf and adjacent the other end with a support in the form of a bolt or pin. At the other end there is provided a pair of aligned openings, one being provided in each of the side walls of the pad, for receiving the bolt or pin which is formed with an axial extending flat surface. A conventional caster assembly including the usual top plate then readily may be mounted in place within the caster pad with opposite ends of the top plate being supported by the support shelf and the locking bolt or pin, respectively. Thus, it is seen that the present caster pad construction provides a means whereby a caster may in a relatively simple, quick and economical manner be mounted in place or disassembled without the necessity of having either to employ separate fasteners and the like to positively secure the caster assembly in place or loosen the separate fasteners when disassembly of the caster assembly from the pad is required. The fact that the caster assembly need not be held in place by separate fasteners is a significant feature of the present invention as will become further apparent from a reading of the description which follows hereinafter. Further, a caster assembly mounting arrangement such as disclosed herein makes it possible to manufacture the caster at a minimal expense and minimizes the labor involved in assembling the caster assembly and the caster pad.

Accordingly, it is a primary object of the present invention to provide a novel and improved mounting arrangement for a caster assembly wherein the need for employing separate means to positively secure the caster assembly to the caster pad is eliminated.

A further object of the present invention is to provide a novel and improved caster pad construction which permits mounting of a caster assembly thereto without the need for employing separate means to positively secure the latter to the pad.

Having in mind the above and other objects that will be evident from an understanding of the present disclosure, the invention comprises devices, combinations and arrangements of parts as illustrated in the presently preferred embodiments of the invention which is hereinafter set forth in such detail as to enable those skilled in the art readily to understand the function, operation, construction and advantages of it when read in conjunction with the accompanying drawings.

BRIEF DESCRIPTION OF THE DRAWINGS

FIG. 1 illustrates an elevational view of a receptacle supported on a mounting assembly constructed and arranged in accordance with the teachings of the present invention;

FIG. 2 illustrates a bottom plan view of a caster pad constructed in accordance with the present invention;

FIG. 3 illustrates a cross-sectional view taken substantially along the line 3—3 of FIG. 2; with FIG. 4 illustrating a cross-sectional view taken substantially along the line 4—4 of FIG. 3;

FIG. 5 illustrates a detached perspective view of the caster pad and support bolt;

FIG. 6 illustrates an alternate preferred embodiment of the present invention;

FIG. 7 illustrating a detached perspective view thereof.

DESCRIPTION OF THE PREFERRED EMBODIMENT

Referring now to the drawings wherein like parts are designated by the same reference character, FIG. 1 shows a container or receptacle 10, such as used in refuse disposal, mounted for easy movement and handling on a plurality of mounting assemblies (only two of which are shown) generally designated 11. The number of assemblies employed may vary with the shape and size of container (e.g., one at each corner of a rectangular container) being supported, but should be sufficient to stabilize the container in an upright position and make for easy handling. Each assembly 11 comprises a hollow cup-shaped metal caster pad 12 having a top wall 13 that may be secured to the bottom of the container or receptacle 11 by suitable means such as welding or by screws or bolt, etc. passing through openings (not shown) provided in the top of the pad 12 into threaded openings or the like (not shown) formed in the container. The pad 12 is illustrated as being of rectangular shape and comprises a pair of side walls 14, 15 and end walls, 16, 17. As best shown in FIG. 2 at one end 16 of the pad there is provided a centrally disposed L-shaped member 18 having a lower shelf portion 19 which extends inwardly for a fixed distance toward the opposite end 17 of the pad. As illustrated, the end wall 16 may comprise substantially only the member 18 with openings being provided on either side, that is, the member 18 may be welded to the pad edge, or as shown in FIG. 2 the pad side and end walls are continuous about its periphery and the shelf 19 extends inwardly from the lower edge on end wall 16. Naturally, the support shelf may be situated on either of the side walls extending inwardly therefrom to provide support for the top plate. At the end 17 of the caster pad 12 there are provided an elongated opening 21 formed in one of the side walls 14 and in the other side wall 15 a second similar elongated opening 22 disposed in alignment with the former. The elongated shape of the openings facilitates passage of a member therethrough. FIG. 3 illustrates a typical conventional caster assembly 23 having the usual caster support or top plate 24 to which the caster or roller 25 is mounted in a conventional manner for universal swivel movement by means of a standard king pin 26 or the like.

To mount the caster assembly 23 in the caster pad 12 the top plate 24 is inserted into the pad such that one end of the plate 24 is supported by the flange or shelf, 19. A bolt 27 then is passed through the elongated openings 21 and 22 with the opposite end of the top plate 24 being disposed between the bolt and the pad top wall 13. As shown, the mid-section of the bolt may be offset relative to its ends for reasons described hereinafter. The plate 24 is of sufficient length so as to be supported at one end by the shelf 19 and at the other end by the bolt 23, and is of such a length that it will not accidentally become disengaged from the caster pad 12. To prevent the bolt from undesirable axial movement or disengagement, a nut 28 is threaded onto the threaded end of the bolt 23. Also, the bolt may be provided with a milled flat 29, which is shown formed on the offset mid-section of the bolt and when disposed as shown in FIG. 3, that is in perpendicular relation relative to the main axis of the opening, provides a flat surface on which the adjacent end of the top plate 24 rests thus preventing undesirable movement of the caster assembly by forcing or camming the top plate up against the pad top wall 13.

Alternatively, instead of the bolt 23 there may be provided a self-locking pin 30, as shown in FIGS. 6 and 7, having a milled flat 31 formed thereon and a key or lug 32 formed at one end thereof for being received in a complemental key hole opening or slot 33 provided in one of the side walls 14. The flat surface may extend radially outward a sufficient distance so as to allow the flat to force the top plate against the pad top wall 13. Once the key 32 passed through the key hole 33 the pin may be turned radially in a direction such that the key functionally engages the surrounding side wall and is securely locked in position against axial movement, with the pad 31 being disposed to hold the top plate against the top wall of the pad thereby to prevent any undesirable movement of the caster assembly top plate supported thereby. Although two types of bolt or pin constructions and arrangements have been disclosed, it is within the scope of this invention to provide various other types that will suffice for the purpose of supporting the top plate while being readily assembled and disassembled. In another embodiment a second pin-shaped member disposed in aligned openings, identical to that described above may be used in place of said flange or support shelf.

Thus, it is seen that simple, efficient, and economical means are provided for readily removably mounting a caster or roller assembly to a caster pad which eliminates the need for employing separate fasteners and the like, thereby substantially reducing all costs such as labor, manufacture, etc. associated therewith.

Various alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

Having thus described the nature of the invention, what is claimed herein is:

1. A mounting assembly adapted for movably supporting a receptacle comprising in combination, support means adapted for securement to said receptacle and being formed adjacent one end thereof with oppositely aligned openings, roller means being detachably mounted in contact relation relative to said support means, means operably associated with said support means for detachably mounting said roller means to said support means and including first support means disposed adjacent the other end of said support means and extending inwardly therefrom and a second substantially means disposed within said aligned openings, said first support means and said second means comprising the sole support for said roller means.

2. A mounting assembly according to claim 1 wherein said first support means comprises a shelf integrally formed with an end of said support means and extending inwardly therefrom toward said one end.

3. A mounting assembly according to claim 1 wherein said second means comprises a self-locking pin.

4. A mounting assembly according to claim 1 wherein one of said openings comprises a keyhole shaped slot and one end of said second member is formed with a radially extended lug for being received in said slot.

5. A mounting assembly according to claim 1 wherein said second means includes a flat surface for supporting an end of said roller means.

6. A caster pad adapted for mounting a caster assembly for easy assembly thereto and quick detachment therefrom, said caster pad comprising a hollow substantially cup-shaped metal member having at one end shelf means integrally formed therewith adapted for operably supporting an end of said caster assembly, and independent pin means operably secured at the other end of said caster pad across its width for operably supporting the opposite end of said caster assembly.

7. A caster pad adapted for mounting a caster assembly for easy assembly thereto and quick detachment therefrom, said caster pad comprising a hollow substantially cup-shaped member having at one end shelf means adapted for operably supporting an end of said caster assembly, and independent means removably secured to the other end of said caster pad across its width for operably supporting the opposite end of said caster assembly.

8. The caster pad of claim 7 wherein said pad has oppositely aligned openings at said other end, said removably secured means being adapted to be disposed within said openings for securing, and being removable therefrom.

* * * * *